US012811914B2

(12) United States Patent
Healy et al.

(10) Patent No.: US 12,811,914 B2
(45) Date of Patent: Nov. 24, 2026

(54) AUTHENTICATION METHOD AND SYSTEM

(71) Applicant: CORRATA LIMITED, Blackrock (IE)

(72) Inventors: Colm Healy, Dublin (IE); Matthieu Bentot, Dublin (IE); Dylan Fermoyle, Dublin (IE); Kevin Mustong, Dublin (IE); Stephen O'Brien, Dublin (IE)

(73) Assignee: CORRATA LIMITED, Blackrock (IE)

( * ) Notice: Subject to any disclaimer, the term of this patent is extended or adjusted under 35 U.S.C. 154(b) by 87 days.

(21) Appl. No.: 18/983,875

(22) Filed: Dec. 17, 2024

(65) Prior Publication Data

US 2025/0211577 A1 Jun. 26, 2025

(30) Foreign Application Priority Data

Dec. 22, 2023 (EP) .................................... 23219668

(51) Int. Cl.
*H04L 29/06* (2006.01)
*H04L 9/40* (2022.01)

(52) U.S. Cl.
CPC ...... *H04L 63/0281* (2013.01); *H04L 63/0236* (2013.01); *H04L 63/0263* (2013.01)

(58) Field of Classification Search
CPC ............. H04L 63/0281; H04L 63/0236; H04L 63/0263
See application file for complete search history.

(56) References Cited

U.S. PATENT DOCUMENTS 9,292,701 B1 * 3/2016 Chebakov ............... G06F 21/53
10,601,777 B2 3/2020 Healy et al.
10,958,662 B1 * 3/2021 Sole .................... H04L 63/0853
2013/0061307 A1 * 3/2013 Livne ...................... G06F 21/44 726/7
2014/0067679 A1 * 3/2014 O'Reilly .......... G06Q 20/40145 705/44
2014/0221035 A1 * 8/2014 Denman ................. H04W 4/08 455/518
2016/0050220 A1 * 2/2016 Niemela ................. G06F 21/83 726/23
2017/0118249 A1 * 4/2017 Motukuru ............... H04L 63/08
2019/0014115 A1 * 1/2019 Bronshtein ......... H04L 63/0823
2021/0144149 A1 * 5/2021 Simons ................... H04L 63/12

FOREIGN PATENT DOCUMENTS

WO WO-0141369 A2 * 6/2001 ......... H04L 63/0838

* cited by examiner

*Primary Examiner* — Shawnchoy Rahman
(74) *Attorney, Agent, or Firm* — Studebaker Brackett PLLC

(57) ABSTRACT

A method of performing user authentication by a mobile device with an authentication client and an authentication server with a rules engine. A security validator intercepts an authentication request sent by the client to the server and validates the authentication request by applying security conditions to it. The security validator blocks the request or forwards the request according to the validation. The system includes a proxy server, and if validation is positive the validator sends the authentication request to the proxy server and the proxy server routes it on to the authentication server. In this case the authentication client is disabled from directly routing an authentication request to the authentication server if the security validator is not present or is tampered with.

16 Claims, 3 Drawing Sheets

AUTHENTICATION METHOD AND SYSTEM

INTRODUCTION

The present invention relates to authentication by a mobile device towards an authentication service.

The purpose of an authentication service is to ascertain the identity of a user. The authentication process may include any number of steps, governed by a number of rules. Each step may involve a number of software and hardware components, and some communication between those components. Each may also involve some interaction with the user.

Figure 1:
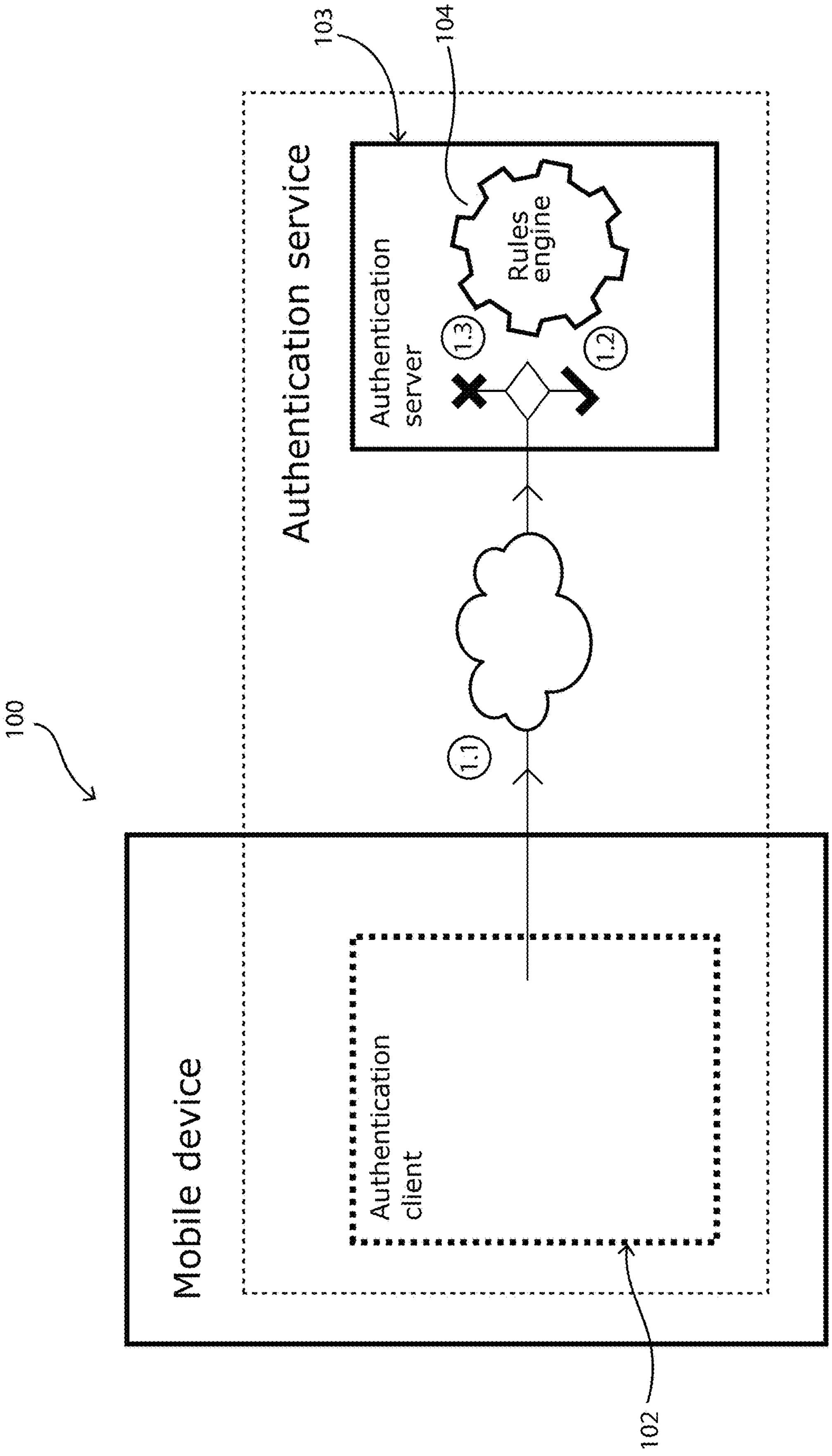

The invention addresses the situation in which an authentication client executes on a mobile device. This may be a part of the device operating system, or a standalone application, or a part of a standalone application, or a discrete component being run in a different application such as a web browser. The authentication client accesses an authentication server over the internet. Referring to FIG. 1, a mobile device (100) has an authentication client (102) which sends data (1.1) to an authentication server (103) which executes a rules engine (104). The server then decides, based on the data received, to either progress the authentication process to the next step (1.2), or aborting it (1.3).

Our prior U.S. Pat. No. 10,601,777 describes such a security validator.

The present invention is directed towards providing enhanced integrity of the authentication process.

SUMMARY OF THE INVENTION

We describe a method of performing user authentication by a system comprising a mobile device with an authentication client and an authentication server with a rules engine, the method comprising the device executing a software security validator in parallel with the authentication client, and the security validator:

- intercepting an authentication request sent by the authentication client to the authentication server,
- validating the authentication request by applying security conditions to the authentication request, and
- blocking the request or forwarding the request according to said validation,
- wherein the system comprises a proxy server, and if validation is positive the validator sends the authentication request to the proxy server and the proxy server routes it on to the authentication server.

In some preferred examples, the security validator executes as a software application on the mobile device. In some preferred examples, the security validator is an Internet proxy.

In some preferred examples, the authentication server:

- performs a check at the Internet IP layer of the network stack to discriminate between incoming authentication traffic coming from the proxy server and that from other authentication traffic in which the proxy server has one or more known IP address, and
- if an authentication request is not from the proxy server, blocking the request.

In some preferred examples, the validator applies a security condition of whether the device recently tried under user instructions to access a phishing site. In some preferred examples, the validator applies a security condition of whether the device is secured by a PIN code or other access control mechanism. In some preferred examples, the validator applies a security condition of whether the device is located in a sensitive country. In some preferred examples, the validator applies a security condition of whether the device is jailbroken, including a setting other than what was intended by the manufacturer.

In some preferred examples, the validator applies a security condition of whether the validator has seen internet traffic to command and control servers, indicating the presence of otherwise undetected malware. In some preferred examples, the validator applies a security condition according to user behavior such as whether the user is trying too many phishing links generally.

In some preferred examples, the validator executes a rule to cause an authorization request to abort immediately if the device is jailbroken or the presence of malware is detected.

In some preferred examples, the validator executes a rule to dynamically compute a score and to decide on proceeding or aborting if the score passes or fails a threshold test.

In some preferred examples, the validator executes a rule to start with a maximum score and reduce the score a certain amount for each negative condition that is evaluated, in which different conditions have different subtracted amounts.

In some preferred examples, the validator determines validation rules by retrieving a policy from a policy server.

We also describe a mobile communication device having digital data processors executing software for an authentication client and a security validator, and a wireless interface circuit and an antenna, wherein the digital data processors are programmed to perform the steps of a method of any example described herein in communication with a proxy server.

DETAILED DESCRIPTION OF THE INVENTION

Figure 2:
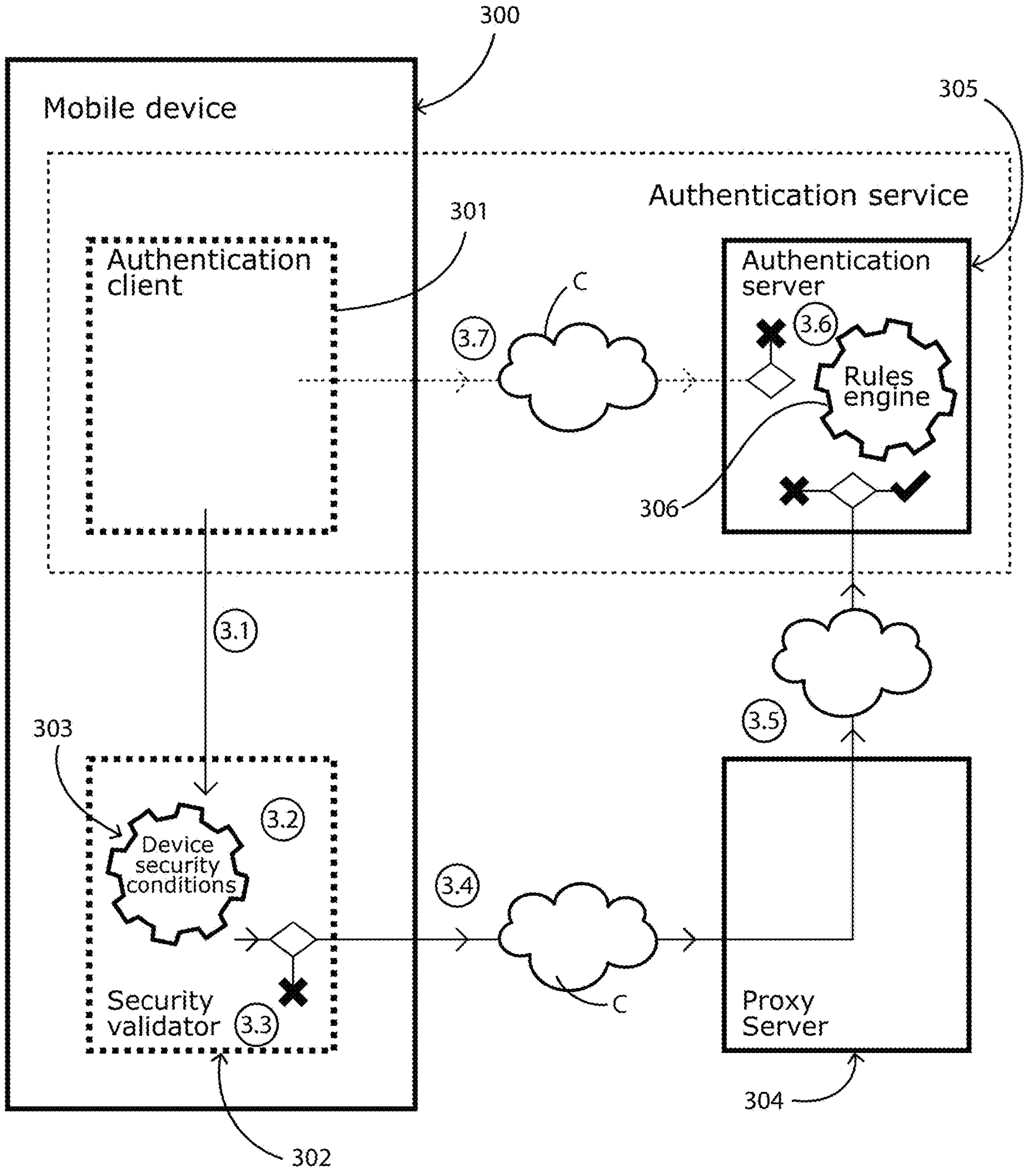
Figure 3:
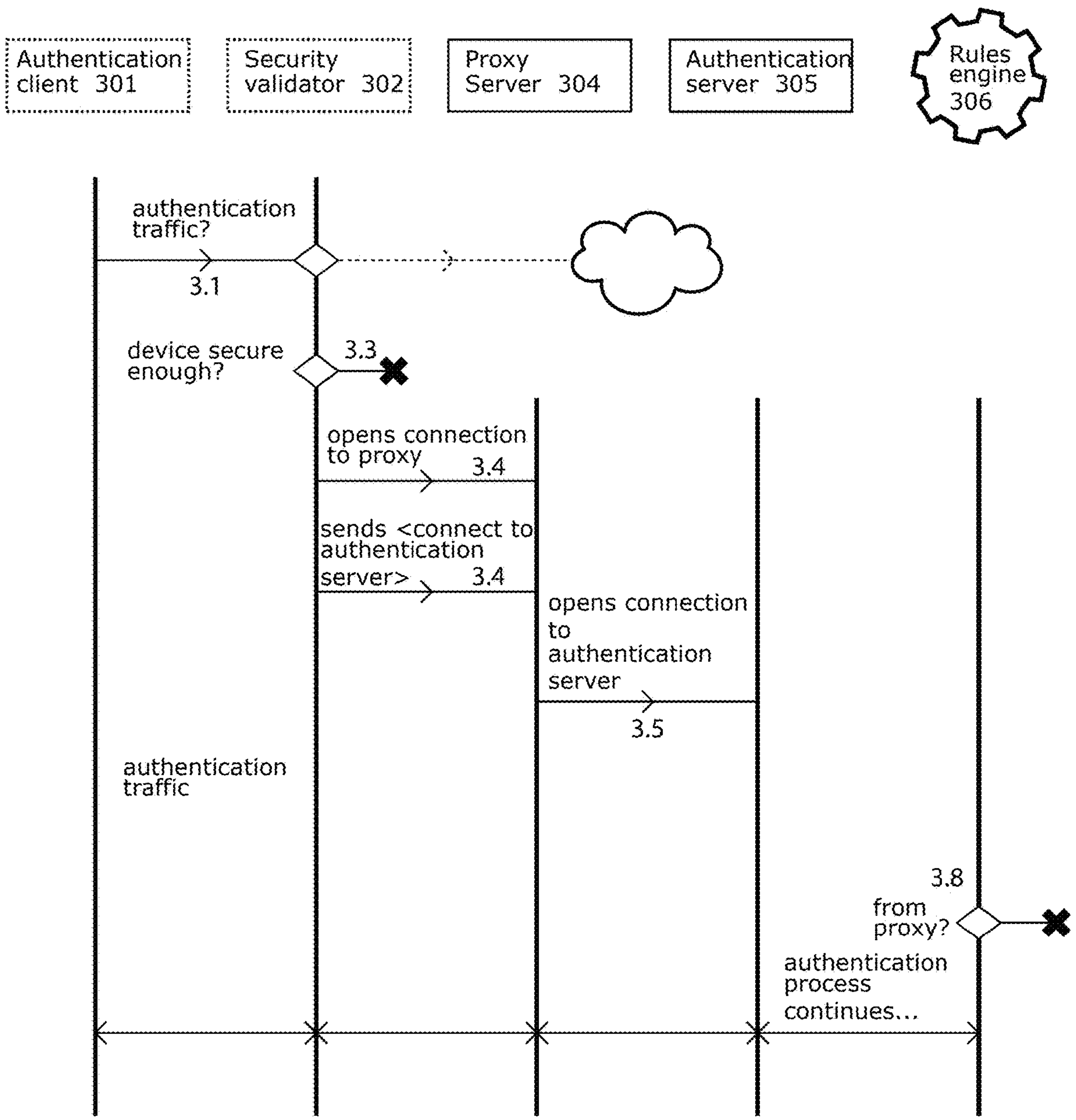

The invention will be more clearly understood from the following description of some embodiments thereof, given by way of example only with reference to the accompanying drawings in which:

FIG. 1 is a block diagram view illustrating a known architecture for a mobile device and authentication server of the prior art, as described above in the introductory passages, FIG. 2 is a block diagram showing an authentication system of the invention comprising a mobile device, an authentication server, and a proxy server, and also showing the major flows in operation of the system, and FIG. 3 is a flow diagram showing the flows in operation of a security validator of the mobile device.

Referring to FIG. 2, a system of the invention comprises a mobile device 300, a proxy server 304, and an authentication server 305 illustrated communicating through the Cloud C. The device 300 comprises an authentication client 301 and a separate security validator 302 implemented in software on the device. The server 305 comprises a rules engine 306 for performing authentication services for many devices including the device 300.

The security validator 302 is a distinct software component that executes on the mobile device 300, that can monitor and intercept network traffic from and to the device 300 and block it if it so chooses. In one example the security validator is a software application executing on the device's operating system. In other examples it may be an Internet proxy. In some examples the security validator 302 performs traffic interception as described in our U.S. Pat. No. 10,601,777.

Referring also to FIG. 3 the validator 302 in step 3.1 intercepts the network traffic and identifies traffic pertaining to the communications between the authentication client 301 and the authentication server 305, by means such as destination IP address, encoded host name, or more generally Deep Packet Inspection.

The validator 302 evaluates in step 3.2 some device security conditions on the device. This evaluation may include a range of criteria. These may for example be:

- internal to the validator 302, for example, did the user recently try to access a phishing site,
- external to the validator 302, for example is the device secured by a PIN code or other access control mechanism, or
- external to the device 300, for example is the device located in a sensitive country?

Also, the conditions may be:

- static (e.g. is the device jailbroken?),
- dynamic (e.g. has the validator seen internet traffic to command-and-control servers recently, indicating the presence of otherwise undetected malware?), or
- behavioral (e.g. is the user trying too many phishing links generally?).

In some examples, the mobile device 300 inserts a VPN program component in the mobile device network stack, and this is used to identify and tag traffic based on IP address and/or deep packet inspection, and it is used to manipulate this traffic based on rules, including blocking it and redirecting it. One of these rules is to open a connection to the proxy server 304 in such a way that it will transparently relay further bidirectional communication to and from a third server, in this case the authorization server 305.

It also describes a new set of conditions, the device security conditions, to decide when to apply rules: when the security status of the mobile device 300 is deemed secure enough. This security evaluation is computed within the security validator, which could be part of the VPN program.

We have described above a number of possible applicable criteria. Some of them are simple, for example: if the device is jailbroken or the presence of malware is detected, then abort.

The rules may compute a synthetic security score that is then compared to a minimum. If the computed score is lower, the authentication attempt is aborted. In one example, the rules start with the maximum score and remove a certain amount for each condition that is evaluated. Different conditions may have different subtracted amounts.

This entire process can be configured by the policy retrieved from a policy server.

In some examples, the security validator 302 performs data inspection using the device's network interface, network stack, and Application Layer residing on the stack. There is a VPN component residing in the network stack and this is configured for bi-directional routing between applications in the Application Layer and external servers including the proxy server 304. The VPN component includes a policy manager and performs the steps of:

- receiving data traffic and routing it in a manner to mimic a VPN client to or from destination servers directly, without a virtual private network server,
- operating as a connection traffic forwarding bi-directional pipeline with traffic identification and with traffic manipulation,
- performing deep packet inspection,
- tagging network traffic with information from a device Internet Layer and a device Transport Layer, and with information decoded from device Application Layer protocols, altering network traffic including performing traffic re-direction, dropping, termination, content change, throttling and/or change of encryption, and
- requesting, with the policy manager, a full or partial policy from a policy server.

In these examples, the VPN component operates as a connection traffic forwarding bi-directional pipeline with usage accounting to track network traffic at the level of bytes and packets. The VPN component usage accounting tracks tags inserted by the VPN component, and the VPN component performs traffic manipulation by altering network traffic based on policies determined by the policy manager (which automatically manages overall operation of the VPN component). In one aspect, the policy manager automatically requests full or partial policies according to conditions which are detected.

A policy includes rules with parameters for any or all of time, location, connection type, network operator, traffic identification tags, and/or usage caps. It is these rules which allow the security validator 302 to apply the security conditions 303.

In one example implementation, the VPN component performs one or more of the following operations:

- identify a destination by IP address by decoding an IP packet;
- identify traffic type by port by decoding TCP or UDP or other internet level packet;
- run deep packet inspection on the traffic by reconstructing application-level traffic and then fully or partially decoding it to identify the actual type;
- run deep packet inspection on traffic by reconstructing application-level traffic and then fully or partially decoding it to extract an intended host name, which may or may not match the IP address;
- run deep packet inspection on traffic by reconstructing application-level traffic and then fully or partially decoding it to extract other Application Layer level information, such as Transport Layer Security TLS encryption; and measure traffic by host and/or service.

In some examples, the VPN component comprises a plurality of inspection functions, each corresponding to a layer of a stack of the device, and each inspection function inspects an incoming message for associated data, extracts any such data, adds a tag representative of the associated layer, and passes the received message less the extracted bytes and plus the tags to a next inspection component. A final inspection function passes its output to the policy manager which decides an onward communication with the proxy server 304 according to a policy. The message sent to the proxy server 304 by the policy manger is augmented by successive layer of the device stack.

In some preferred examples the VPN component operates as a state machine, with states based on status of connection with a server.

Preferably, the states include states for:

- connected to proxy server 304, but waiting for acknowledgement from a device application, and/or
- connections established, with bi-directional communicators between the device applications and the server, and/or
- connected to proxy server but pending shut-down caused by acknowledgement from application, and/or
- connection closed.

The functions include a deep packet inspection function which inspects traffic payload and adds application-levels tags and maintains a state that allows it to resume processing when the next packet is available.

The policy manager determines a policy from the policy manager before invoking said deep packet inspection function, to bypass the deep packet inspection function processing if the internet packet and transport packet tags are sufficient to determine an applicable policy. Also, the VPN component comprises a transport-level decoder function and the policy manager directs this function to close a connection between a device application and a server, or to modify the content, or to use a different connection.

The VPN component reverses effects of network traffic crossing the device, in which it reverses effects of the device Network Stack so that the device operating system redoes these effects on the way to the server and applies the effects of the network stack for the device operating system to undo them on the way from the server, so that the VPN component mimics the effect of inserting itself between the Internet layer and Link Layer.

The following is pseudocode of an example code executed by the validator:

```
function allow AuthenticationAttempt:
  input:
    policy//The policy as retrieved from the policy server
    authenticationServer//The authentication server to
      which a connection attempt was detected
  output:
    boolean//true if the attempt is allowed to proceed,
      false otherwise
  for serverRuleSet in policy.authenticationServerRule-
    Sets
    if serverRuleSet.servers includes authentication-
      Server then
      let ruleSet=serverRuleSet.rules//A set of rules that
        apply to the authentication server
      let evaluation=isRuleSetSatisfied (ruleSet)
      if evaluation is false then
        return false
      end if
    end if
  end for
  return true
function isRuleSetSatisfied:
  input:
    ruleSet//The set of rules
  output:
    boolean//true if the attempt is allowed to proceed for
      this rule set, false otherwise
  var score=100//The security score
  for rule in ruleSet
    let ruleEvaluation=evaluate (rule)
    if ruleEvaluation is false then
      if rule is mandatory then
        return false
      else
        let score=score−rule.scoreAmount
      end if
    end if
  end for
  if score<ruleSet.minimumScore then
    return false
  else
    return true
  end if
```

Since evaluating some of the conditions may be time consuming, the result of the conditions and the final score may be stored for some time, allowing it to be reused (caching). Based on this evaluation, the validator 302 determines whether the device 300 is deemed secure enough to proceed with authentication. If it is not, the authentication traffic sent by the authentication client 301 is blocked in step 3.3, preventing the authentication from completing.

An abort of the authentication request can be performed by simply ignoring the traffic; not do anything. The authentication client will then time out. This works for TCP and UDP but is likely to result in another attempt.

Another is to send up a packet containing an RST reply and not send any outbound traffic, terminating the TCP connection.

If it is, the authentication traffic sent by the authentication client 301, that should have been sent to the authentication server, is instead forwarded in step 3.4 to the proxy server 304. The security validator 302 opens a network connection to the proxy server 304 and instructs it to in turn open a connection to the authentication server 305.

The purpose of the proxy server 304 is to, in turn, forward traffic it receives to another computer, in this case the authentication server 305, in step 3.5. Conversely, replies are forwarded back to the original computer, in this case the mobile device 300.

This allows the proxy server 304 to act as a transparent intermediary between the mobile device 300 and authentication server 305.

At the Internet (IP) layer of the network stack, however, the authentication server 305 is able to discriminate between incoming authentication traffic coming from the proxy server 304 and that from other authentication traffic. The former will have specific, known IP addresses.

Rules are added to the authentication process so that authentication traffic that does not come from the IP addresses of the proxy server 304 aborts the authentication process in step 3.6, either always, or only if the originating device is determined to be a mobile device.

If the validator 302 is removed or in some way disabled, possibly by user action or by malicious software, the data from the authentication client 301 will still reach the authentication server 305 unimpeded, as shown by flow 3.7, but the authentication process will fail (3.6).

Components of embodiments can be employed in other embodiments in a manner as would be understood by a person of ordinary skill in the art. The invention is not limited to the embodiments described but may be varied in construction and detail.

The invention claimed is:

1. A method of performing user authentication by a system comprising a mobile device with an authentication client and an authentication server with a rules engine, the method comprising the device executing a software security validator in parallel with the authentication client, and the security validator:

intercepting an authentication request sent by the authentication client to the authentication server, validating the authentication request by applying security conditions to the authentication request, blocking the request or forwarding the request according to said validation, wherein the system comprises a proxy server, and if validation is positive the validator sends the authentication request to the proxy server and the proxy server routes it on to the authentication server, and wherein the security validator is an Internet proxy, and wherein the authentication server: performs a check at the Internet (IP) layer of the network stack to discriminate between incoming authentication traffic coming from the proxy server and that from other authentication traffic in which the proxy server has one or more known IP address, and if an authentication request is not from the proxy server, blocking the request.

2. The method as claimed in claim 1, wherein the security validator executes as a software application on the mobile device.

3. The method as claimed in claim 1, wherein the security validator is an Internet proxy.

4. The method as claimed in claim 1, wherein the validator applies a security condition of whether the device recently tried under user instructions to access a phishing site.

5. The method as claimed in claim 1, wherein the validator applies a security condition of whether the device is secured by a PIN code or other access control mechanism.

6. The method as claimed in claim 1, wherein the validator applies a security condition of whether the device is located in a sensitive country.

7. The method as claimed in claim 1, wherein the validator applies a security condition of whether the device is jailbroken, including a setting other than what was intended by the manufacturer.

8. The method as claimed in claim 1, wherein the validator applies a security condition of whether the validator has seen internet traffic to command and control servers, indicating the presence of otherwise undetected malware.

9. The method as claimed in claim 1, wherein the validator applies a security condition according to user behavior such as whether the user is trying too many phishing links generally.

10. The method as claimed in claim 1, wherein the validator executes a rule to cause an authorization abort immediately if the device is jailbroken or the presence of malware is detected.

11. The method as claimed in claim 1, wherein the validator executes a rule to dynamically compute a score and to decide on proceeding or aborting if the score passes or fails a threshold test.

12. The method as claimed in claim 1, wherein the validator executes a rule to dynamically compute a score and to decide on proceeding or aborting if the score passes or fails a threshold test; and wherein the validator executes a rule to start with a maximum score and reduces the score a certain amount for each negative condition that is evaluated, in which different conditions have different subtracted amounts.

13. A method as claimed in claim 1, wherein the validator determines validation rules by retrieving a policy from a policy server.

14. A mobile communication device comprising digital data processors configured to execute software for an authentication client and a security validator, and a wireless interface circuit an antenna, wherein the digital data processors are configured to perform the steps of a method in communication with a proxy server, and said method steps comprise:

intercepting an authentication request sent by the authentication client to the authentication server, validating the authentication request by applying security conditions to the authentication request, blocking the request or forwarding the request according to said validation, wherein the system comprises a proxy server, and if validation is positive the validator sends the authentication request to the proxy server and the proxy server routes it on to the authentication server, and wherein the digital data processors are configured to perform the steps of:

operate the security validator as an Internet proxy, and operate the authentication server to:

perform a check at an Internet (IP) layer of a device network stack to discriminate between incoming authentication traffic coming from the proxy server and that from other authentication traffic in which the proxy server has one or more known IP address, and if an authentication request is not from the proxy server, block the request.

15. The mobile communication device of claim 14, wherein the digital data processors are configured to operate the validator to execute a rule to dynamically compute a score and to decide on proceeding or aborting if the score passes or fails a threshold test; and to execute a rule to start with a maximum score and reduce the score a certain amount for each negative condition that is evaluated, in which different conditions have different subtracted amounts.

16. A mobile communication device comprising digital data processors configured to execute software for an authentication client and a security validator, and a wireless interface circuit an antenna, wherein the digital data processors are configured to perform the steps of a method in communication with a proxy server, and said method steps comprise:

intercepting an authentication request sent by the authentication client to the authentication server, validating the authentication request by applying security conditions to the authentication request, and blocking the request or forwarding the request according to said validation, wherein the system comprises a proxy server, and if validation is positive the validator sends the authentication request to the proxy server and the proxy server routes it on to the authentication server, and wherein the digital data processors are configured to operate the validator to execute a rule to dynamically compute a score and to decide on proceeding or aborting if the score passes or fails a threshold test; and to execute a rule to start with a maximum score and reduce the score a certain amount for each negative condition that is evaluated, in which different conditions have different subtracted amounts.

* * * * *